(12) United States Patent
Endo et al.

(10) Patent No.: US 11,448,839 B2
(45) Date of Patent: Sep. 20, 2022

(54) OPTICAL CONNECTION STRUCTURE

(71) Applicant: Nippon Telegraph and Telephone Corporation, Tokyo (JP)

(72) Inventors: Jun Endo, Tokyo (JP); Kota Shikama, Tokyo (JP); Atsushi Aratake, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/052,788

(22) PCT Filed: May 10, 2019

(86) PCT No.: PCT/JP2019/018733
§ 371 (c)(1),
(2) Date: Nov. 3, 2020

(87) PCT Pub. No.: WO2019/225355
PCT Pub. Date: Nov. 28, 2019

(65) Prior Publication Data
US 2021/0231888 A1   Jul. 29, 2021

(30) Foreign Application Priority Data
May 21, 2018   (JP) .............................. JP2018-096926

(51) Int. Cl.
*G02B 6/42* (2006.01)
*G02B 6/122* (2006.01)
(Continued)

(52) U.S. Cl.
CPC ......... *G02B 6/4239* (2013.01); *G02B 6/1228* (2013.01); *G02B 6/30* (2013.01); *G02B 6/4206* (2013.01); *G02B 6/32* (2013.01)

(58) Field of Classification Search
CPC .. G02B 6/4239; G02B 6/1228; G02B 6/4206; G02B 6/30; G02B 6/32
(Continued)

(56) References Cited

U.S. PATENT DOCUMENTS 5,231,684 A * 7/1993 Narciso, Jr. .............. G02B 6/32
385/33
6,253,003 B1   6/2001 Nakamura
(Continued)

FOREIGN PATENT DOCUMENTS

JP        H1152168 A    2/1999
JP      2008032931 A    2/2008
(Continued)

OTHER PUBLICATIONS

Wikipedia, The Free Encyclopedia, May 27, 2021, 06:42 UTC, <https://en.wikipedia.org/w/index.php?title=Return_loss&oldid=1025372869> [accessed Sep. 26, 2021], 4 pages.*
(Continued)

*Primary Examiner* — Michael P Mooney
(74) *Attorney, Agent, or Firm* — Slater Matsil, LLP

(57) ABSTRACT

A first adhesive layer is provided to be in contact with an SSC. A second adhesive layer is provided to be in contact with an optical fiber. A lens structure is on an interface between the first adhesive layer and the second adhesive layer.

14 Claims, 16 Drawing Sheets

(51) Int. Cl.
*G02B 6/30* (2006.01)
*G02B 6/32* (2006.01)

(58) Field of Classification Search
USPC .............................................. 385/33, 49–51
See application file for complete search history.

(56) References Cited

U.S. PATENT DOCUMENTS

| | | | | |
|---|---|---|---|---|
| 2001/0033722 | A1* | 10/2001 | Okada | G02B 6/4239 |
| | | | | 385/94 |
| 2009/0316273 | A1 | 12/2009 | Viens | |
| 2009/0316723 | A1 | 12/2009 | Kobatake | |
| 2013/0236193 | A1* | 9/2013 | Sengupta | G02B 6/14 |
| | | | | 398/143 |
| 2015/0260917 | A1* | 9/2015 | Imai | G02B 6/02042 |
| | | | | 385/27 |
| 2019/0258175 | A1* | 8/2019 | Dietrich | G03F 7/2053 |

FOREIGN PATENT DOCUMENTS

| | | |
|---|---|---|
| JP | 2017134225 A | 8/2017 |
| WO | 2014034726 A1 | 3/2014 |

OTHER PUBLICATIONS

Lee, Bernard, Senko Advanced Components White Paper "Optical Return Loss Measurement", Sep. 2016, 14 pages.*

* cited by examiner

Fig. 5

| MAIN ITEM | SUB-ITEM | SYMBOL | UNIT |
|---|---|---|---|
| SSC (STRAIGHT SECTION) | REFRACTIVE INDEX OF CLAD | n2_st | − |
| | REFRACTIVE INDEX OF CORE | n1_st | − |
| | WIDTH OF CORE | w_st | μm |
| | THICKNESS OF CORE | t_st | μm |
| | WAVEGUIDE LENGTH | L_st | μm |
| SSC (TAPERED SECTION) | REFRACTIVE INDEX OF CLAD | n1_ta | − |
| | REFRACTIVE INDEX OF CORE | n2_ta | − |
| | INCIDENCE SIDE OF TAPER/WIDTH OF CORE | wi_ta | μm |
| | INCIDENCE SIDE OF TAPER/THICKNESS OF CORE | ti_ta | μm |
| | EMISSION SIDE OF TAPER/WIDTH OF CORE | wo_ta | μm |
| | EMISSION SIDE OF TAPER/THICKNESS OF CORE | to_ta | μm |
| | LENGTH OF TAPER | L_ta | μm |
| Si WAVEGUIDE SECTION | REFRACTIVE INDEX OF CLAD | n2_wg | − |
| | REFRACTIVE INDEX OF CORE | n1_wg | − |
| | WIDTH OF CORE | w_wg | μm |
| | THICKNESS OF CORE | t_wg | μm |
| | WAVEGUIDE LENGTH | L_wg | μm |
| FIBER | REFRACTIVE INDEX OF CLAD | n2_fi | − |
| | REFRACTIVE INDEX OF CORE | n1_fi | − |
| | RELATIVE REFRACTIVE INDEX DIFFERENCE | Δ | % |
| | DIAMETER OF CORE | dia | μm |
| | LENGTH OF FIBER | L_fi | μm |

Fig. 6

| MAIN ITEM | SUB-ITEM | SYMBOL | UNIT |
|---|---|---|---|
| FIRST ADHESIVE LAYER | REFRACTIVE INDEX | na1 | — |
| | LAYER LENGTH | La1 | μm |
| SECOND ADHESIVE LAYER | REFRACTIVE INDEX | na2 | — |
| | LAYER LENGTH | La2 | μm |
| THIRD ADHESIVE LAYER | REFRACTIVE INDEX | na3 | — |
| | LAYER LENGTH | La3 | μm |
| FIRST LENS STRUCTURE | REFRACTIVE INDEX | nl1 | — |
| | RADIUS OF CURVATURE (LEFT) | Rl1 | μm |
| | RADIUS OF CURVATURE (RIGHT) | Rr1 | μm |
| | THICKNESS OF LENS | tl1 | μm |
| | HEIGHT OF LENS | D1 | μm |
| SECOND LENS STRUCTURE | REFRACTIVE INDEX | nl2 | — |
| | RADIUS OF CURVATURE (LEFT) | Rl2 | μm |
| | RADIUS OF CURVATURE (RIGHT) | Rr2 | μm |
| | THICKNESS OF LENS | tl2 | μm |
| | HEIGHT OF LENS | D2 | μm |

Fig. 7

| MAIN ITEM | SUB-ITEM | SYMBOL | UNIT | NOTE |
|---|---|---|---|---|
| SSC SIDE | MODE FIELD DIAMETER | MFD | μm | |
| | EMISSION ANGLE | $\theta_s$ | deg | |
| | NUMERICAL APERTURE | $NA_s$ | — | $n_{a1} \cdot \sin(\theta_s)$ |
| OPTICAL FIBER SIDE | VIEW HEIGHT | $h_v$ | μm | |
| | INCIDENCE ANGLE | $\theta_t$ | deg | |
| | NUMERICAL APERTURE | $NA_t$ | — | $n_{a3} \cdot \sin(\theta_t)$ |

PRIOR ART

OPTICAL CONNECTION STRUCTURE

CROSS-REFERENCE TO RELATED APPLICATIONS

This application is a national phase entry of PCT Application No. PCT/JP2019/018733, filed on May 10, 2019, which claims priority to Japanese Application No. 2018-096926, filed on May 21, 2018, which applications are hereby incorporated herein by reference.

TECHNICAL FIELD

The present invention relates to an optical connection structure coupling (connecting) optical waveguides, the mode fields of which are different.

BACKGROUND

A demand for high integration of optical components increases with a rapid increase in the amount of information transmission in optical communication. A technique called "silicon photonics" is known as a technique suitable for the high integration of the optical components.

With the use of a waveguide that has a higher refractive index difference than a conventional silica-based waveguide, the silicon photonics can make a bending radius small. The waveguide can be integrated with an electronic circuit, and it is therefore possible to obtain high productivity using semiconductor manufacturing tools such as those for integrated circuits. Accordingly, the research and development in the silicon photonics is actively underway as an element technology for realizing further miniaturization and cost reduction in optical components.

In the silicon photonics, a waveguide (hereinafter, also referred to as Si waveguide) is composed of a core made of silicon (Si) and a clad made of silica ($SiO_2$). For transmitting guided light in the Si waveguide through an optical fiber with high coupling efficiency, a structure is necessary to match a mode field of the Si waveguide with a mode field of the optical fiber is obtained.

FIG. 14 shows an example, as a conventional example, in which a tapered structure (a shape in which a width of the waveguide is gradually narrowed in a propagation direction of the light) is formed in the Si waveguide (for example, see Patent Literature 1). In this example, a tapered structure is formed in an Si waveguide 20 so that a cross-sectional area of the core is monotonically reduced in the propagation direction of the light. The Si waveguide 20 is coupled (connected) to an optical fiber 22 through an adhesive layer 21. Hereinafter, members such as the Si waveguide 20, the adhesive layer 21, and the optical fiber 22 located in a propagation path of the light are also referred to as media.

In the example shown in FIG. 14, a mode filed diameter of the light guided in the Si waveguide 20 is gradually expanded from a position before reaching an end face of the Si waveguide 20 as shown in FIG. 15($b$), reaches the end face of the Si waveguide 20, and is radiated to the adhesive layer 21. FIG. 15($a$) shows a medium distribution. In FIGS. 14 and 15, a z-axis indicates the propagation direction of the light (direction along an optical axis), a y-axis indicates a vertical direction, and an x-axis indicates a horizontal direction.

A mode field distribution of the light radiated from the Si waveguide 20 is determined depending on refractive indices of the core and the clad layer of the Si waveguide 20, an inclination angle of the tapered structure, and a refractive index distribution of the adhesive layer 21. In this case, the mode field distribution of the light radiated from the Si waveguide 20 is preferably converted into a plane wave. FIG. 15($b$) shows a state close to the plane wave (radiation angle ($\theta a1$): small).

CITATION LIST

Patent Literature
Patent Literature 1: Japanese Patent Laid-Open No. 11-52168.

SUMMARY

Technical Problem

However, in the example shown in FIG. 14, a divergence from an ideal plane wave may occur (radiation angle ($\theta a1$): large) due to the manufacturing error of structural parameters and the like, as shown in FIG. 15($c$). Such a divergence of the plane wave is one of causes of the decrease in coupling efficiency between the Si waveguide 20 and the optical fiber 22.

An object of embodiments of the present invention, which have been made to solve such problems, is to provide an optical connection structure capable of improving coupling efficiency between optical waveguides, the mode fields of which are different.

Means for Solving the Problem

In order to achieve such an object, embodiments of the present invention provide an optical connection structure (100) coupling a first optical waveguide (1) with a second optical waveguide (5), mode fields of which are different, the optical connection structure including: a plurality of adhesive layers (2, 4) that are provided in a propagation direction of light from the first optical waveguide (1) to the second optical waveguide (5); and a lens structure (3) that is provided on an interface between the plurality of adhesive layers (2, 4).

In embodiments of the present invention, a mode field distribution of light radiated from a first waveguide (1) is approximated to a plane wave by the lens structure (3) provided on the interface between the plurality of adhesive layers (2, 4), and thus it is possible to reduce radiation mode light propagating through a clad layer of a second optical waveguide (5) and improve coupling efficiency between the first optical waveguide (1) and the second waveguide (5).

In embodiments of the present invention, for example, a refractive index of each of the adhesive layers (2, 4) and a refractive index of each of the clad layers of the optical waveguides (1, 5) in contact with the adhesive layers (2, 4) are set so that a return loss between connections is 25 dB or more, a refractive index of each of the adhesive layers (2, 4) and a refractive index of the lens structure (3) in contact with the adhesive layers (2, 4) are set so that a return loss between connections is 25 dB or more, or a distance between an end face of the lens structure (3) and each of end faces of the optical waveguides (1, 5) close to the lens structure (3) is set to a value that is not a neighborhood value of an integral multiple of an effective half-wavelength of the light propagating in the adhesive layers (2, 4) located between the end faces, thereby it is possible to reduce excessive resonance that occurs between media having different refractive indices.

In embodiments of the present invention, the plurality of adhesive layers may include a first adhesive layer (2), a second adhesive layer (4), and a third adhesive layer (7), the lens structures may include a first lens structure (3) and a second lens structure (6), the first adhesive layer (2) may be provided to be in contact with the first optical waveguide (1), the third adhesive layer (7) may be provided to be in contact with the second optical waveguide (5), the second adhesive layer (4) may be provided to be in contact with the first adhesive layer (2) and the third adhesive layer (7), the first lens structure (3) may be provided on an interface between the first adhesive layer (2) and the second adhesive layer (4) and the second lens structure (6) may be provided on an interface between the second adhesive layer (4) and the third adhesive layer (7).

With such a structure, for example, the first adhesive layer (2), the first lens structure (3), and the second adhesive layer (4) have a same refractive index, a radius of curvature of the first lens structure (3) is smaller than a radius of curvature of the second lens structure (6), and when the refractive index of the first adhesive layer (2) is na1, the refractive index of the first lens structure (3) is nl1, the refractive index of the second adhesive layer (4) is na2, the refractive index of the second lens structure (6) is nl2, and the refractive index of the third adhesive layer (7) is na3, conditions of nl1≥na1, nl1≥na2, nl2≥na2, and nl2≥na3 are satisfied.

Further, for example, the first adhesive layer (2), the second adhesive layer (4), and the third adhesive layer (7) have a refractive index of 1.0 or more and 1.7 or less, the first lens structure (3) and the second lens structure (6) have a refractive index of 1.4 or more and 1.7 or less, a mode field diameter of guided light in the first optical waveguide (1) is smaller than a mode field diameter of guided light in the second optical waveguide (5), and a numerical aperture of propagation light in the first adhesive layer (2) in contact with the first optical waveguide (1) is larger than a numerical aperture of propagation light in the third adhesive layer (7) in contact with the second optical waveguide (5).

In the above description, as an example, the constituent elements in the drawings corresponding to the constituent elements of embodiments of the invention are indicated by reference numerals in parentheses.

Effects of Embodiments of the Invention

As described above, according to embodiments of the present invention, a mode field distribution of light radiated from a first waveguide is approximated to a plane wave by a lens structure provided on an interface between a plurality of adhesive layers, and thus it is possible to reduce radiation mode light propagating through a clad layer of a second optical waveguide and improve coupling efficiency between the first optical waveguide and the second waveguide.

BRIEF DESCRIPTION OF THE DRAWINGS

FIG. 5 is a view showing definitions of the structural parameters of the SSC and the optical fiber.

FIG. 6 is a view showing definitions of the structural parameters (structural parameters of the micro optical body between the SSC and the optical fiber) of the micro optical body between the SSC and the optical fiber.

FIG. 7 is a view showing definitions of imaging analysis parameters.

DETAILED DESCRIPTION OF ILLUSTRATIVE EMBODIMENTS

Embodiments of the present invention will be described in detail below with reference to the drawings.

Embodiment 1

Figure 1:
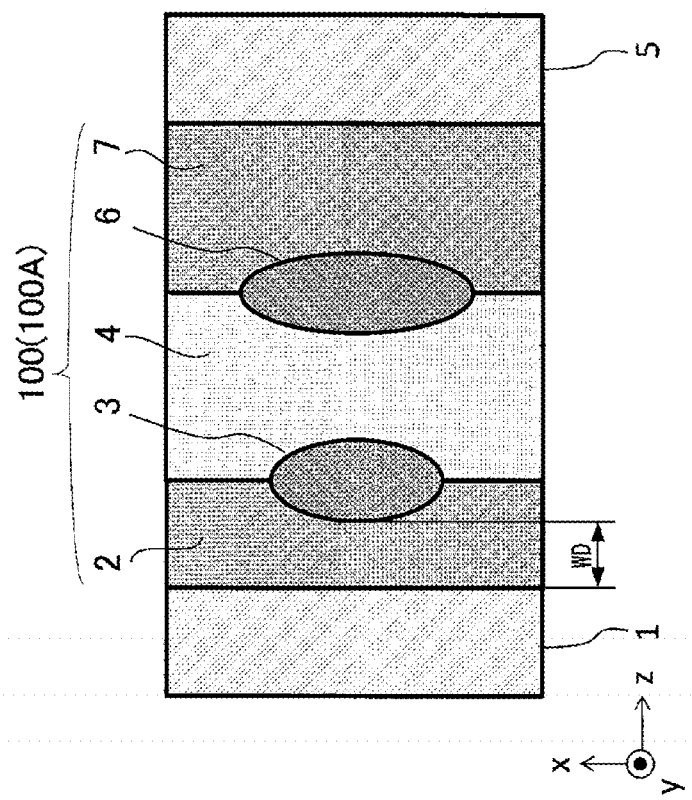
FIG. 1 is a schematic diagram showing an optical connection structure (micro optical body) according to a first embodiment (Embodiment 1) of the present invention.
Figure 14:
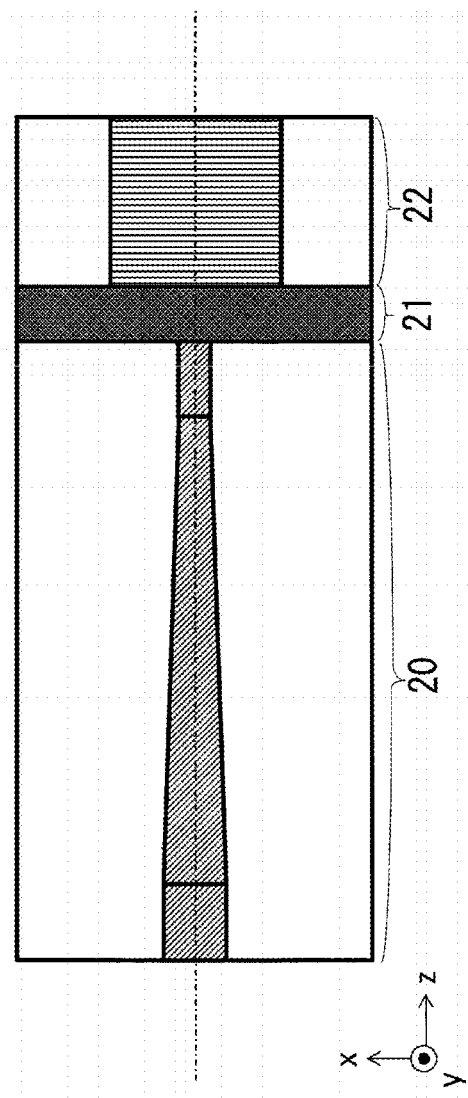
FIG. 14 is a schematic diagram showing an example (conventional example) in which a tapered structure is formed in an Si waveguide.
Figure 15:
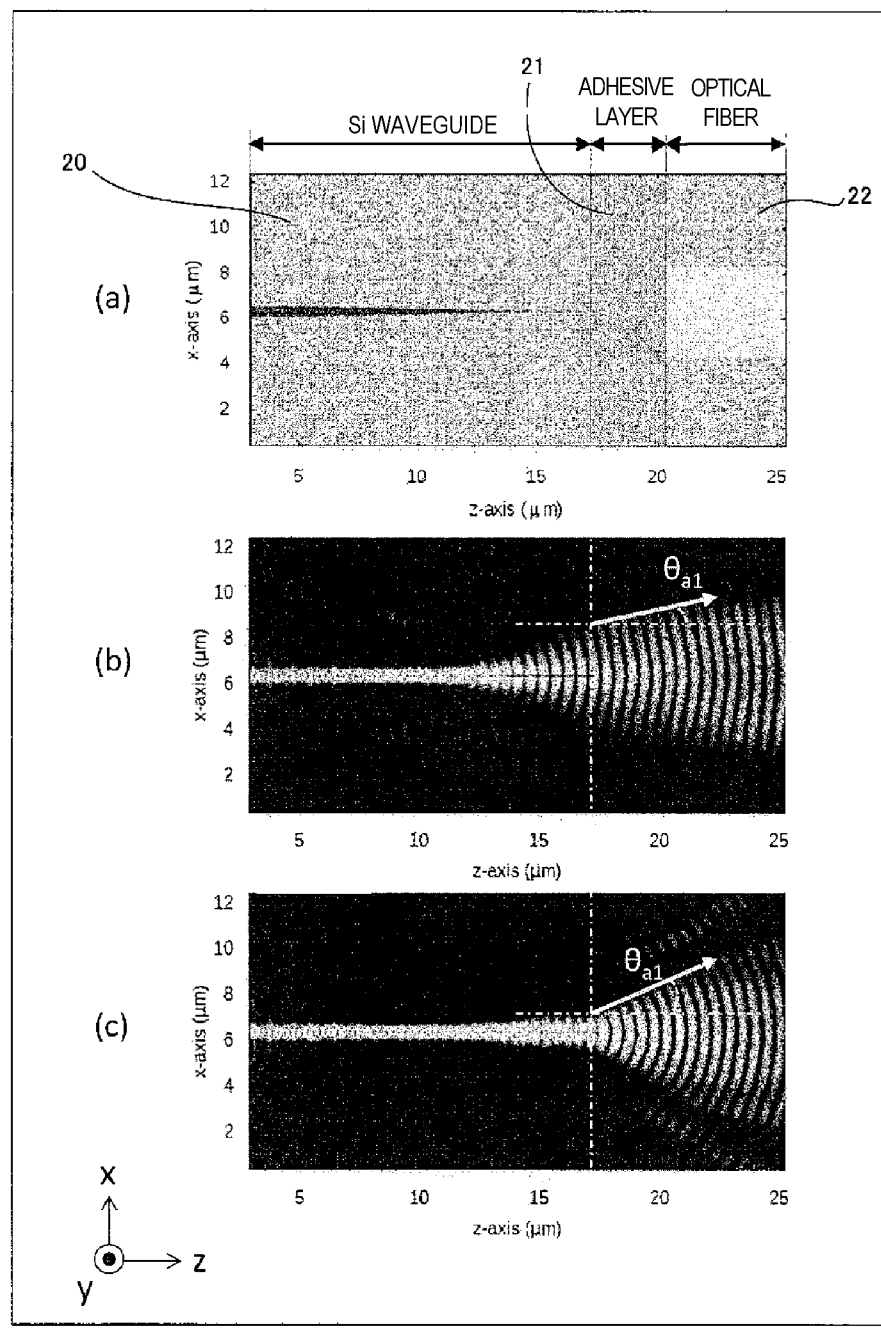
FIG. 15 is a view showing an example of a mode field conversion process in the conventional example.

FIG. 1 is a schematic diagram showing an optical connection structure according to a first embodiment (Embodiment 1) of the present invention. An optical connection structure 100 is a structure of a part corresponding to an adhesive layer 21 shown in FIG. 14, and is provided between an Si waveguide (an Si waveguide having a tapered structure) 1 with a cross-sectional area of a core being monotonically reduced in a propagation direction of light, and an optical fiber 5.

Hereinafter, the optical connection structure is referred to as a micro optical body, and the Si waveguide is referred to as an SSC. In order to distinguish the optical connection structure from an optical connection structure (micro optical body) 100 (FIG. 13) of Embodiment 2 to be described below, a micro optical body 100 of Embodiment 1 will be denoted by 100A, and a micro optical body 100 of Embodiment 2 will be denoted by 100B.

Figure 13:
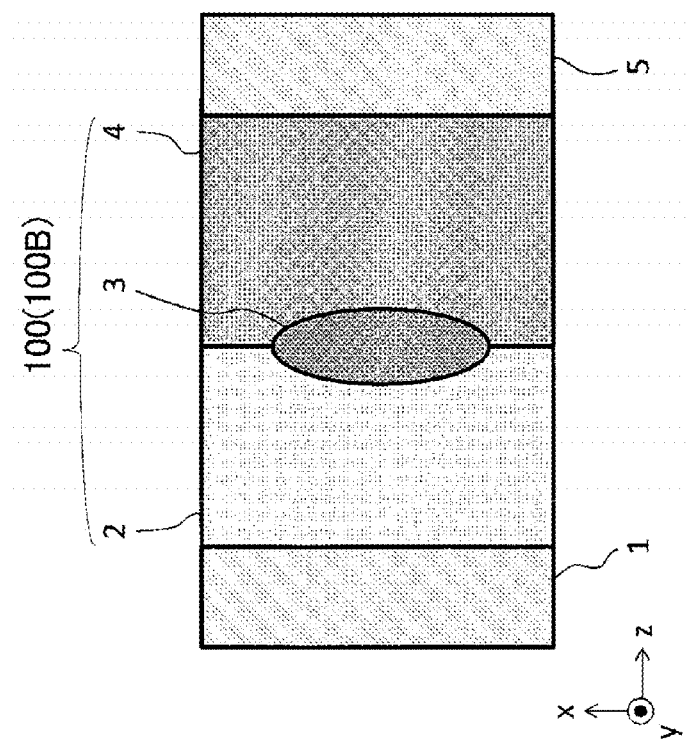
FIG. 13 is a schematic diagram showing an optical connection structure (micro optical body) according to a second embodiment (Embodiment 2) of the present invention.

In the configurations shown in FIGS. 1 and 13, Si serving as a material of the core of the SSC 1 is transparent with respect to light having a wavelength of 1.3 to 1.6 μm. In addition, a refractive index of the core of the SSC 1 is 3.5, a clad layer is made of a silica-based material and is sequentially formed on the same substrate by an etching process, and a refractive index of the clad layer is 1.44. A cross-sectional shape of the core of the SSC 1 is a rectangle (an oblong shape), a length (height) in a y-axis direction (vertical direction) of the rectangle corresponds to a diameter of the core of the SSC 1, and the diameter of the core of the SSC 1 has a constant value.

In the configuration shown in FIGS. 1 and 13, the refractive index of the clad layer of the optical fiber (silica optical fiber) 5 is set to 1.44, and a cutoff wavelength is set to 1.5 μm or 1.3 μm. Further, the diameter of the core of the optical fiber 5 is set to 4 μm in consideration of reduction of bending loss.

The core and the clad layer of the SSC 1 may be formed of another semiconductor material such as a compound semiconductor, an inorganic material, or an organic material. In addition, a planar lightwave circuit having a rectangular core formed of another inorganic material or organic material may be used instead of the optical fiber 5.

The micro optical body 100A shown in FIG. 1 includes a first adhesive layer 2, a second adhesive layer 4, a third adhesive layer 7, a first lens structure 3, and a second lens structure 6.

In the micro optical body 100A, the first adhesive layer 2 is provided to be in contact with the SSC 1, the third adhesive layer 7 is provided to be in contact with the optical fiber 5, and the second adhesive layer 4 is provided to be in contact with the first adhesive layer 2 and the third adhesive layer 7.

Further, the first lens structure 3 is provided on an interface between the first adhesive layer 2 and the second adhesive layer 4, and the second lens structure 6 is provided on an interface between the second adhesive layer 4 and the third adhesive layer 7. The first lens structure 3 and the second lens structure 6 include spherical surfaces on the surfaces of the structures, respectively.

In the micro optical body 100A, the first adhesive layer 2, the second adhesive layer 4, and the third adhesive layer 7 have a refractive index being 1.0 or more and 1.7 or less, and the first lens structure 3 and the second lens structure 6 have a refractive index being 1.4 or more and 1.7 or less.

Figure 2:
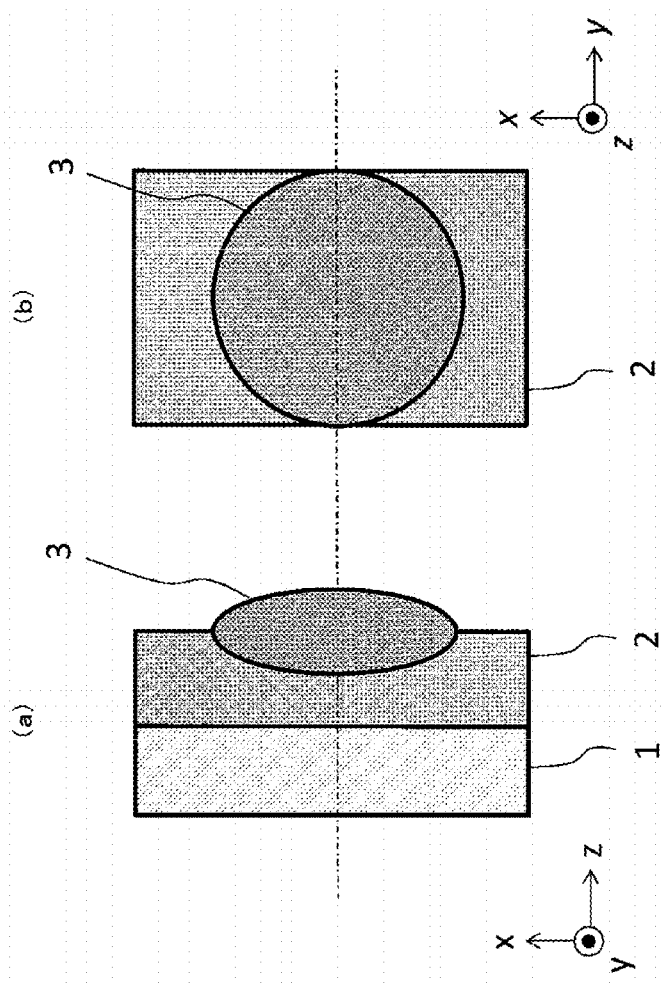
FIG. 2 is a schematic diagram of a region including a first adhesive layer and a first lens structure in FIG. 1 as viewed from a zx plane and an xy plane.

FIG. 2(a) is a schematic diagram of a region including the first adhesive layer 2 and the first lens structure 3 as viewed from a zx plane (a top), and FIG. 2(b) is a schematic diagram of the region including the first adhesive layer 2 and the first lens structure 3 as viewed from a xy plane (a front).

Figure 3:
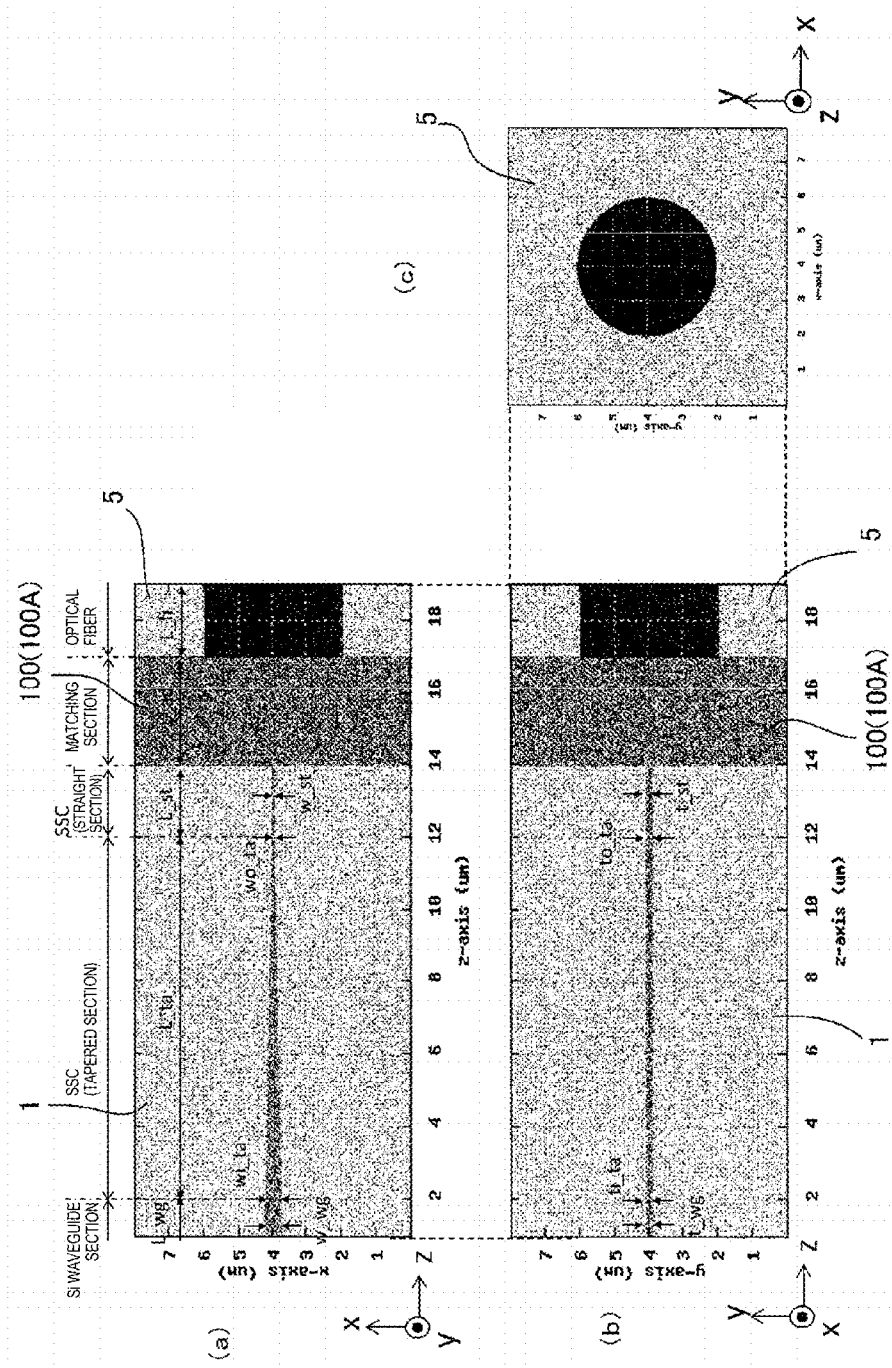
FIG. 3 is a view showing structural parameters of an Si waveguide (SSC) and an optical fiber in FIG. 1.

FIG. 3 shows a structural parameter of the SSC 1 and the optical fiber 5. The micro optical body 100A is provided between the SSC 1 and the optical fiber 5, as a matching section.

Figure 4:
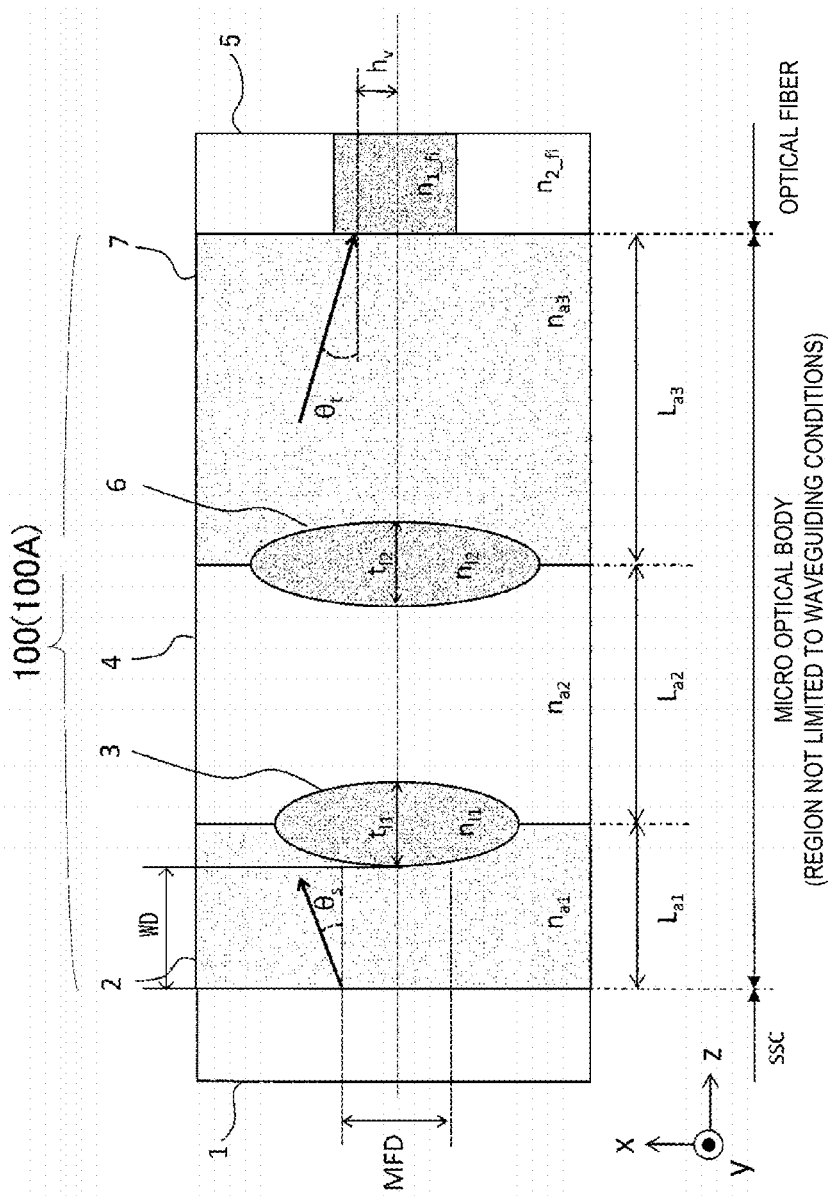
FIG. 4 is a view showing structural parameters (structural parameters of a micro optical body between the SSC and the optical fiber) of the adhesive layer and the lens structure in FIG. 1.

FIG. 3(a) is a medium distribution diagram as viewed from a zx plane (a top), FIG. 3(b) is a medium distribution diagram as viewed from an yz plane (a side), and FIG. 3(c) is a medium distribution diagram as viewed from a xy plane (a front). FIG. 4 shows structural parameters of the adhesive layers 2, 4, and 7 and the lens structures 3 and 6 which form the micro optical body 100A. In the drawing, an alternate long and short dash line indicates a central axis of the waveguide core.

FIG. 5 shows definitions of structural parameters of the SSC 1 and the optical fiber 5, FIG. 6 shows definitions of structural parameters of the micro optical body 100A provided between the SSC 1 and the optical fiber 5, and FIG. 7 shows definitions of imaging analysis parameters (to be described below). A specific value of each parameter is set according to a "design flowchart of the optical waveguide and the micro optical body" shown in FIG. 8.

Figure 8:
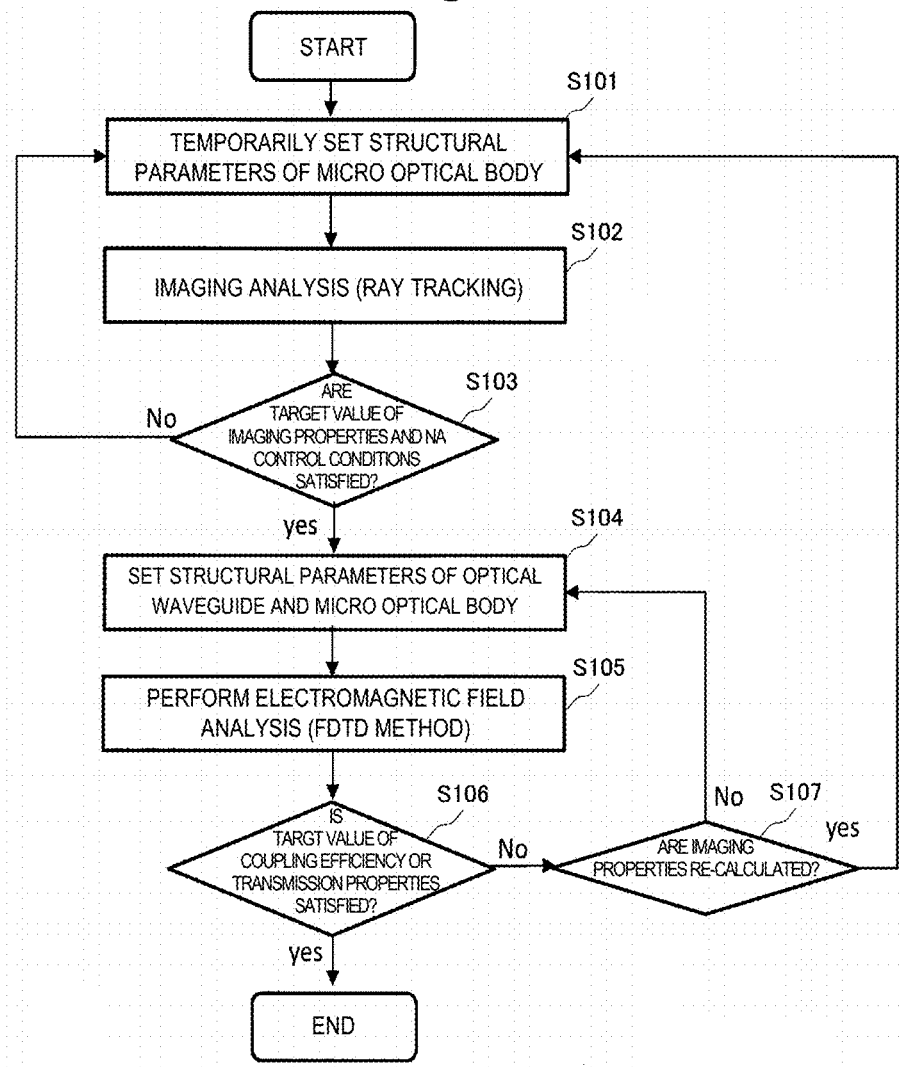
FIG. 8 is a view showing a design flowchart of an optical waveguide and the micro optical body.
Figure 9A:
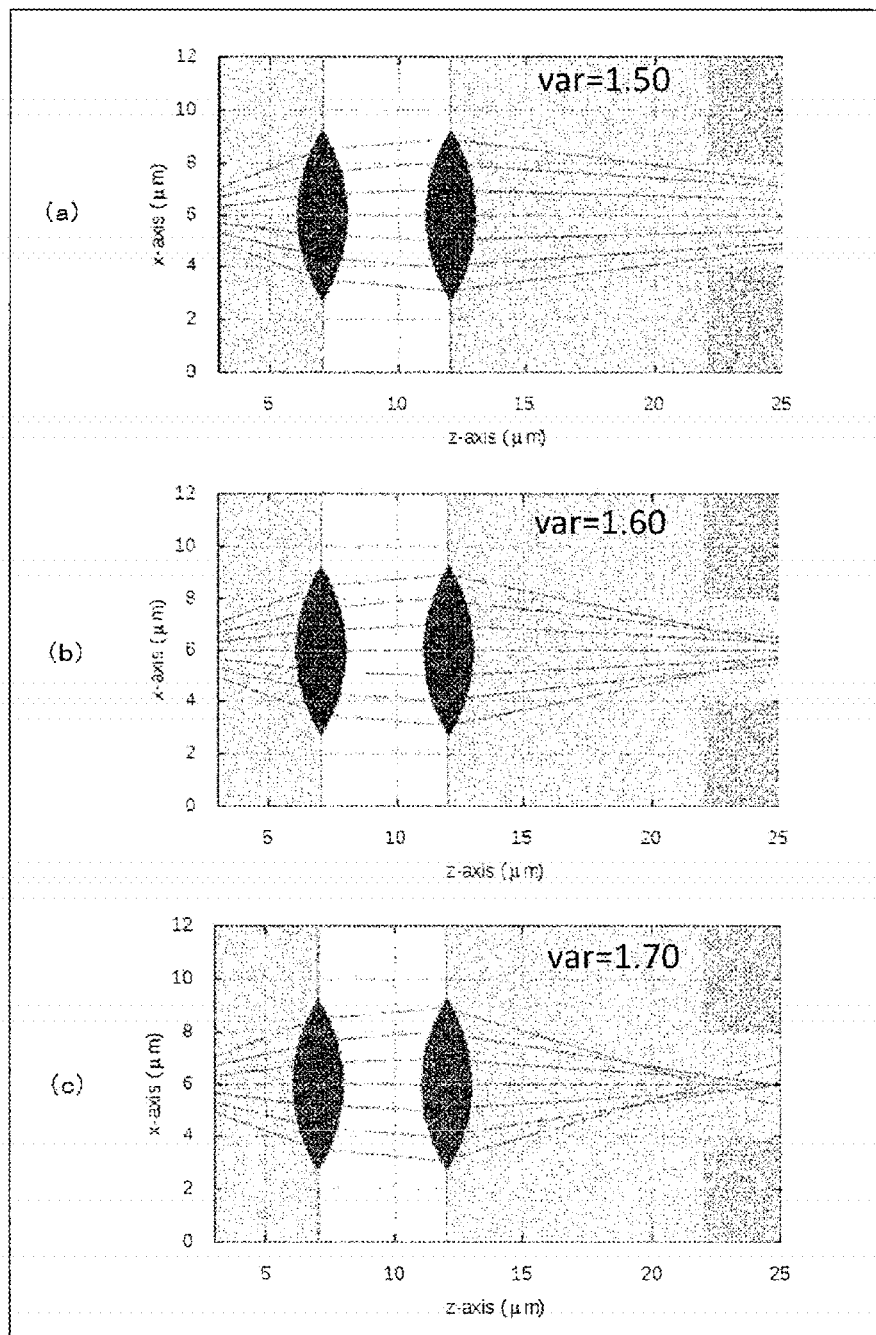
FIG. 9A is a view showing a relation between imaging properties of the micro optical body and a typical structural parameter (a result of ray tracking when a refractive index nl1 (=var) of the first lens structure is 1.50, 1.60, and 1.70).
Figure 9B:
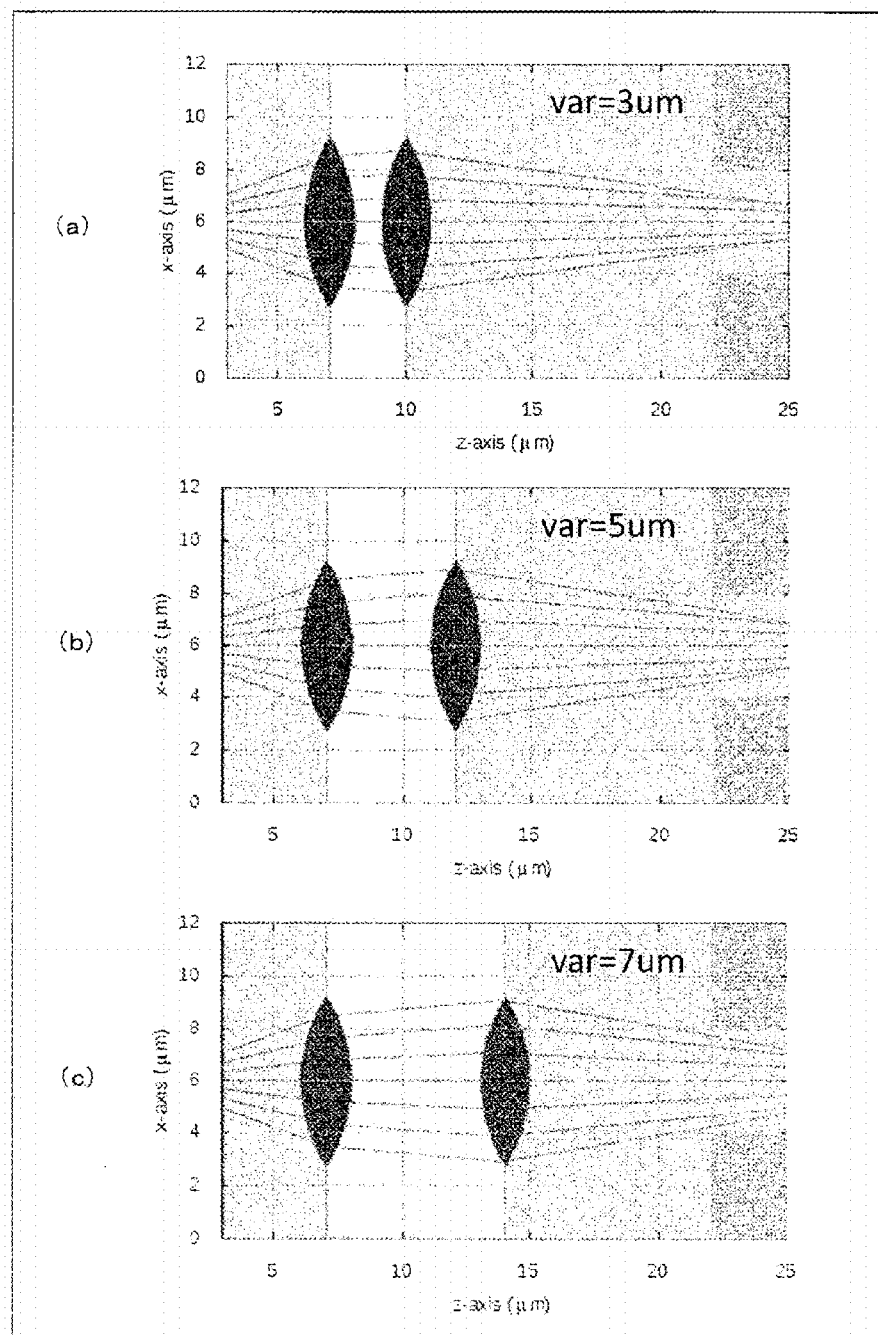
FIG. 9B is a view showing a relation between imaging properties of the micro optical body and a typical structural parameter (a result of ray tracking when a layer length La2 (=var) of the second adhesive layer is 3 μm, 5 μm, and 7 μm).
Figure 9C:
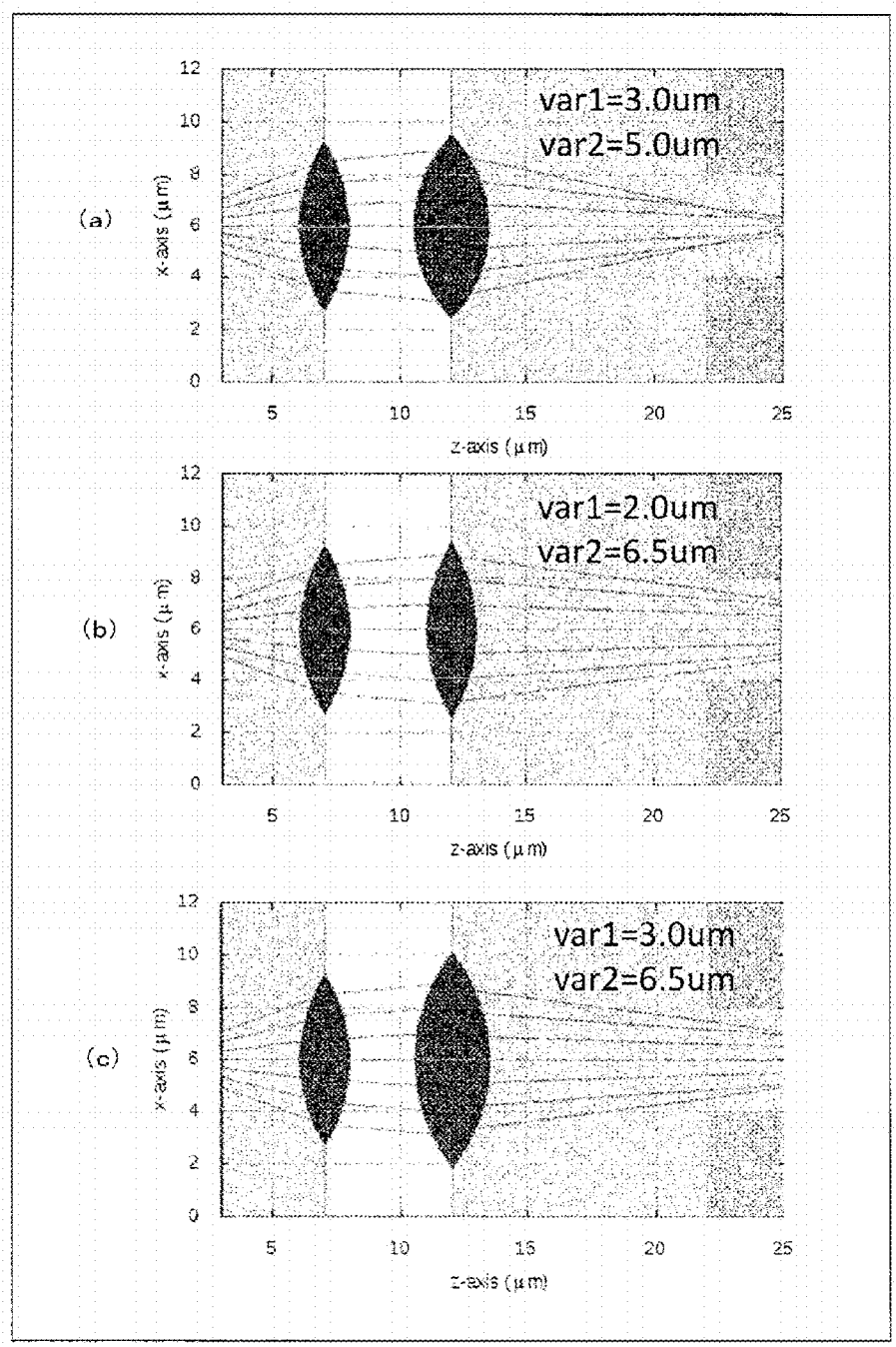
FIG. 9C is a view showing a relation between imaging properties of the micro optical body and a typical structural parameter (a result of ray tracking when a set (=(var1, var2)) of a thickness tl2 and a radius of curvature R2 (Rl2, Rr2) of the second lens structure is (3.0 μ, 5.0 μm), (2.0 μm, 6.5 μm), and (3.0 μm, 6.5 μm).

FIGS. 9A, 9B, and 9C are diagrams showing a relation between imaging properties of the micro optical body and typical structural parameters, and show results of estimation of the structure of the micro optical body 100A with an imaging analysis process (step S102) incorporated into the design flowchart shown in FIG. 8.

FIG. 9A shows a result of ray tracking when a refractive index nl1 of the first lens structure 3 is 1.50, 1.60, and 1.70, FIG. 9B shows a result of ray tracking when a layer length La2 of the second adhesive layer 4 is 3 μm, 5 μm, and 7 μm, and FIG. 9C shows a result of ray tracking when a set of a thickness tl2 and a radius of curvature R2 (Rl2, Rr2) of the second lens structure 6 is (3.0 μm, 5.0 μm), (2.0 μm, 6.5 μm), and (3.0 μm, 6.5 μm).

In a typical structure of the present embodiment, a refractive index na1 of the first adhesive layer 2 is 1.50, a refractive index nl1, a thickness tl1, and a radius of curvature R1 (Rl1, Rr1) of the first lens structure 3 are 1.70, 2.0 μm, 6.0 μm respectively, a refractive index na2 of the second adhesive layer 4 is 1.0, a refractive index nl2, a thickness tl1, and a radius of curvature R2 (Rl2, Rr2) of the second lens structure 6 are 1.60, 2.0 μm, 6.5 μm, respectively, and a refractive index na3 of the third adhesive layer 7 is 1.60. In addition, layer lengths La1, La2, and La3 of the first adhesive layer 2, the second adhesive layer 4, and the third adhesive layer 7 are arbitrarily set according to allowable coupling tolerance in x-, y-, z-directions, and are variable between about 3 μm and 200 μm. An acrylic or epoxy resin material or a silica glass material is applied to the first adhesive layer 2, the second adhesive layer 4, and the third adhesive layer 7. When the refractive index na2 is 1.0, the second adhesive layer 4 is filled with a gas such as air in addition to the resin material or the glass material described above.

In setting the above parameters, it is necessary to simultaneously satisfy the restriction on a minimum numerical aperture NA1 on the side of SSC 1 (a minimum numerical aperture of propagation light in the first adhesive layer 2 which is in contact with the SSC 1), the restriction on a maximum numerical aperture NA2 on the side of the optical fiber 5 (a maximum numerical aperture of propagation light in the third adhesive layer 7 which is in contact with the optical fiber 5), and a maximum value hvmax of a view height hv imaged on an end face of the optical fiber 5.

Figure 10:
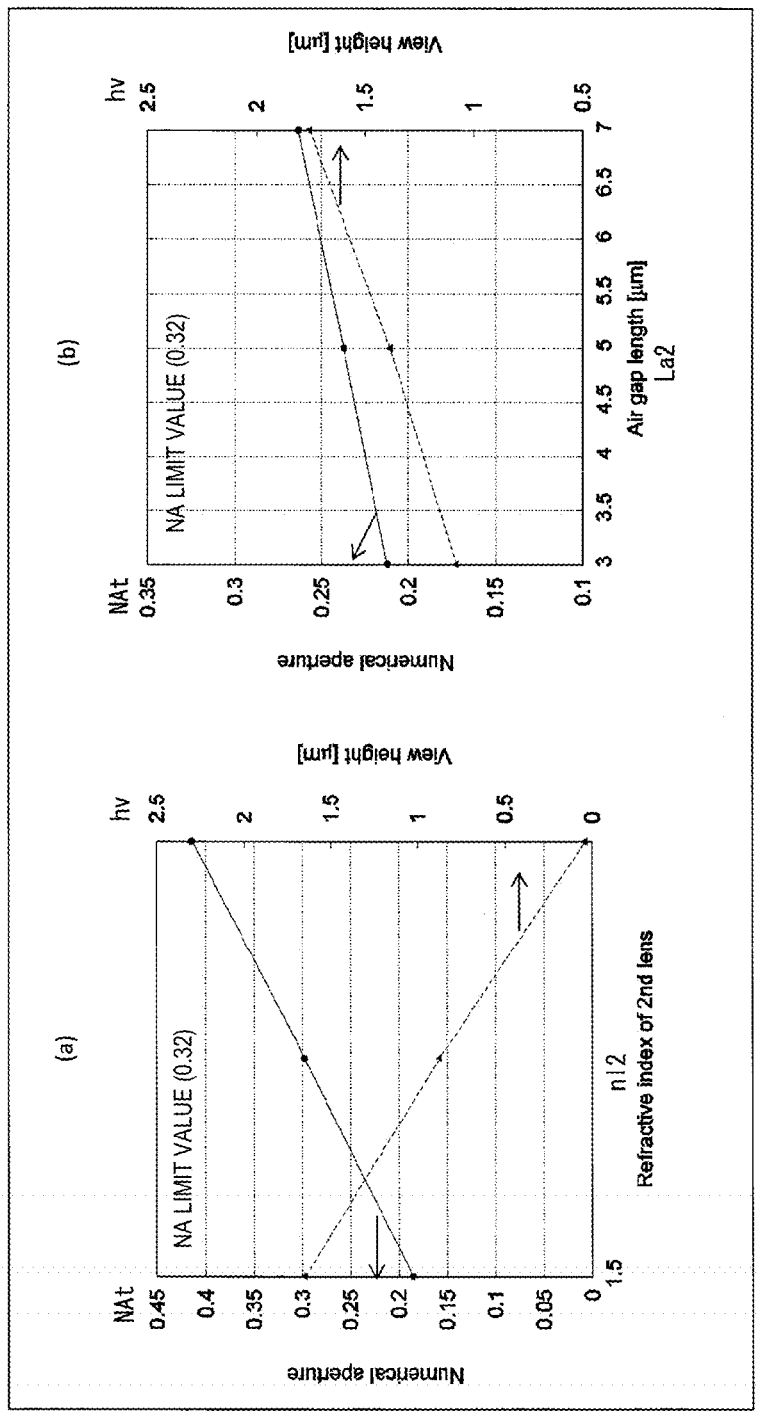
FIG. 10 is a view showing structural parameter setting indices of the micro optical body.

A relation between the refractive index nl2 of the second lens structure 6 and the numerical aperture (light-receiving numerical aperture) NAt (left axis) on the side of the optical fiber 5 and a view height hv (right axis) shown in FIG. 10(a) and a relation between the layer length La2 of the second adhesive layer 4 and the numerical aperture (light-receiving numerical aperture) NAt (left axis) on the side of the optical fiber 5 and the view height hv (right axis) shown in FIG. 10(b) is one of structural parameter setting indices of the micro optical body 100A. In Embodiment 1, the following conditions are satisfied: NA1=0.52, NA2=0.32, and hvmax=1.5 μm.

Further, based on the parameters set by the above imaging analysis (step S102), resonances respectively generated between the lens structures 3 and 6 and the optical waveguides (SSC 1 and optical fiber 5) are predicted, and the parameters are adjusted. For this, the following methods are applied.

There is a first method of matching the refractive index of the adhesive layer with the refractive index of the clad layer of the optical waveguide in contact with the adhesive layer. In this case, the matching means that a return loss between the connections is set to 25 dB or more. For example, the refractive index na1 of the first adhesive layer 2 may match with a refractive index n2_st of the clad layer of the SSC 1 in contact with the first adhesive layer 2, or the refractive index na3 of the third adhesive layer 7 may match with a refractive index n2_fi of the clad layer of the optical fiber 5 in contact with the third adhesive layer 7.

In the first method, when the refractive index na1 of the first adhesive layer 2 matches with the refractive index n2_st of the clad layer of the SSC 1, for example, the refractive index na1 of the first adhesive layer 2 is made equal to the refractive index n2_st of the clad layer of the SSC 1. In other words, in Embodiment 1, since the refractive index n2_st of the clad layer of the SSC 1 is 1.44, the refractive index na1 of the first adhesive layer 2 is 1.44.

There is a second method of matching the refractive index of the adhesive layer with the refractive index of the lens structure in contact with the adhesive layer. In this case, the matching means that the return loss between the connections is set to 25 dB or more. For example, the refractive index na1 of the first adhesive layer 2 matches with the refractive index nl1 of the first lens structure 3 in contact with the first adhesive layer 2, the refractive index na2 of the second adhesive layer 4 matches with the refractive index nl1 of the first lens structure 3 and the refractive index nl2 of the second lens structure 6 in contact with the second adhesive layer 4, or the refractive index na3 of the third adhesive layer 7 matches with the refractive index nl2 of the second lens structure 6 in contact with the third adhesive layer 7.

In the second method, when the refractive index na1 of the first adhesive layer 2 matches with the refractive index nl1 of the first lens structure 3 and the refractive index na2 of the second adhesive layer 4, for example, the refractive index na1 of the first adhesive layer 2 is made equal to the refractive index nl1 of the first lens structure 3 and the refractive index na2 of the second adhesive layer 4.

Note that the refractive index na1 of the first adhesive layer 2, the refractive index nl1 of the first lens structure 3, the refractive index na2 of the second adhesive layer 4, the refractive index nl2 of the second lens structure 6, and the refractive index na3 of the third adhesive layer 7 preferably satisfy the following conditions of $nl1 \geq na1$, $nl1 \geq na2$, $nl2 \geq na2$, and $nl2 \geq na3$.

There is a third method of setting a distance (shortest distance) between an end face of the first lens structure 3 and an end face of the SSC 1 close to the first lens structure 3 to a value that is not a neighborhood value of an integral multiple of an effective half-wavelength of the light propagating in the first adhesive layer 2 located between the end faces.

For example, a distance WD between the end face of the first lens structure 3 and the end face of the SSC 1 is set to satisfy a condition of $1.05 \lambda_{eff}*(m-1)/2 < WD < 0.95 \lambda_{eff}*m/2$ ($\lambda_{eff}$: effective wavelength, m: integer). A specific example, WD=3.3 μm, when $\lambda_{eff}$=0.52 μm and m=7.

In any of the first, second, and third methods described above, it is possible to obtain an effect of reducing excessive resonance that occurs between media having different refractive indices.

In the structural parameters that are finally set (step S104) by the design flowchart (repetition of steps S101 to S103) shown in FIG. 8, single-mode guided light having a wavelength of 1.55 μm is incident on the SSC 1, and an electromagnetic field analysis is executed by a finite difference time domain (FDTD) method (step S105).

Figure 11:
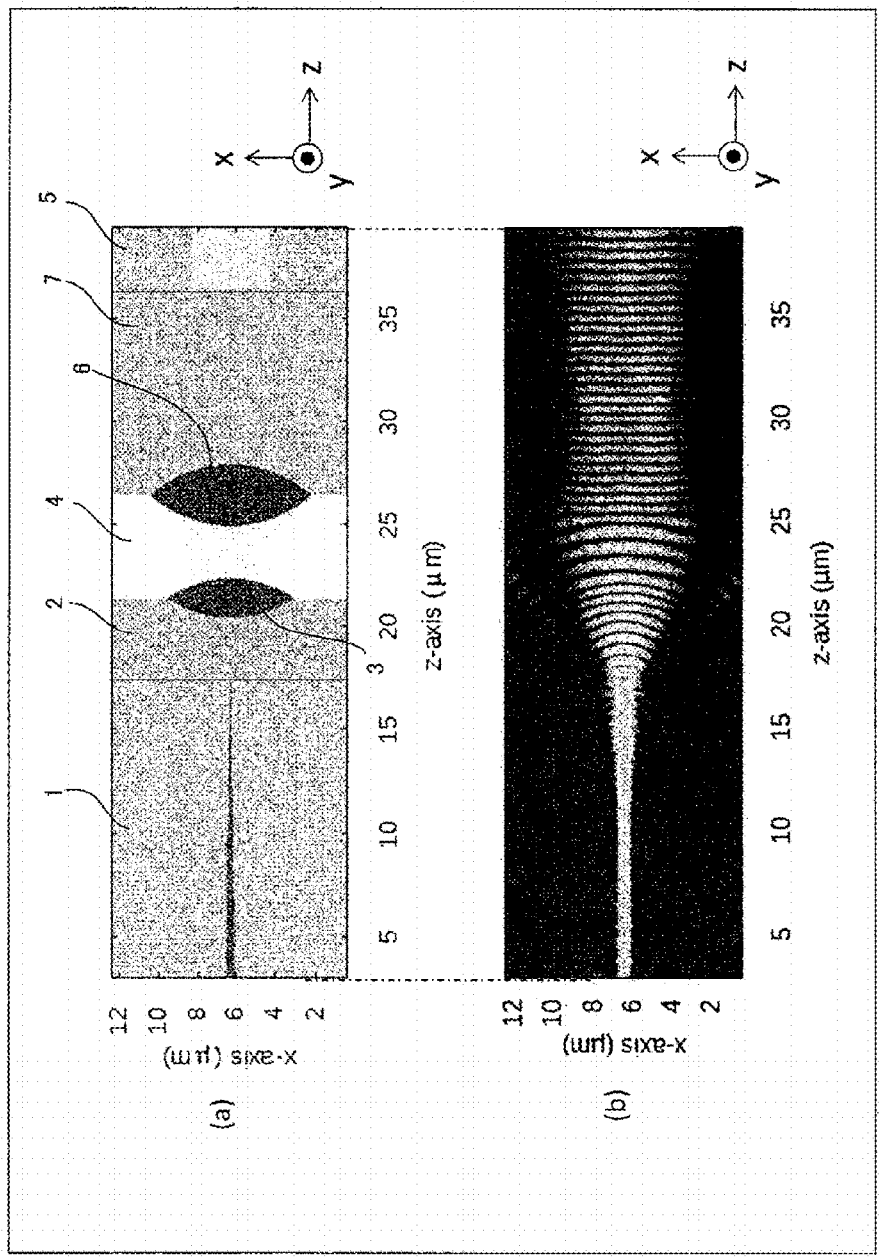
FIG. 11 is a view showing a waveguiding analysis result in Embodiment 1.

The electromagnetic field analysis is repeated by the FDTD method while the imaging properties are re-calculated (step S107) until a target value of coupling efficiency or transmission properties is satisfied in step S106. FIG. 11 shows a result (waveguiding analysis result) obtained by execution of the electromagnetic field analysis by the FDTD method. FIG. 11(a) shows a medium distribution in the zx plane, and FIG. 11(b) shows a power distribution in the zx plane.

Figure 12:
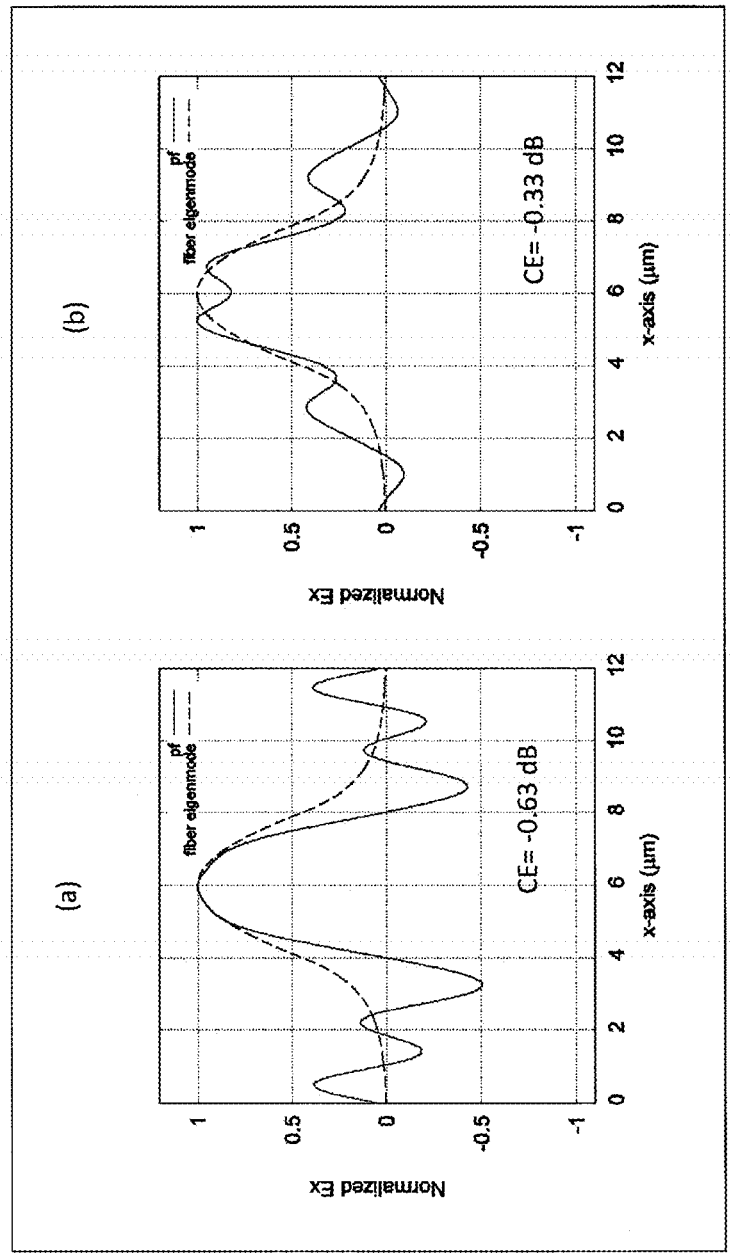
FIG. 12 is a view showing a comparison of a conventional example and Embodiment 1 in a mode field distribution (x direction) of the optical fiber obtained based on the waveguiding analysis.

FIG. 12 shows a comparison of a conventional example (an example shown in FIG. 14) and Embodiment 1 (the example shown in FIG. 1) in a mode field distribution (x direction) of the optical fiber 5 obtained based on the waveguiding analysis. In the conventional example (FIG. 12(a)), a radiation mode is significant in a fiber clad layer. On the other hand, in Embodiment 1 (FIG. 12(b)), the light in the radiation mode is reduced and a value of a coupling efficiency CE calculated from an overlap integral is also improved.

Embodiment 2

FIG. 13 is a schematic diagram showing an optical connection structure according to a second embodiment (Embodiment 2) of the present invention. An optical connection structure (micro optical body) 100B includes a first adhesive layer 2, a second adhesive layer 4, and a lens structure 3.

In the micro optical body 100B, the first adhesive layer 2 is provided to be in contact with an SSC 1, and the second adhesive layer 4 is provided to be in contact with an optical fiber 5. In addition, the lens structure 3 is provided on an interface between the first adhesive layer 2 and the second adhesive layer 4. The lens structure 3 includes a spherical surface on the surface of the structure.

In the micro optical body 100B, a core diameter of the optical fiber 5 is 10 μm, and a cutoff wavelength is 1.3 μm or 1.5 μm. A refractive index na1 of the first adhesive layer 2 is 1.0. The lens structure 3 is formed of a spherical surface, and has a radius of curvature R1 (Rl1, Rr1) of 8 μm or more, a thickness of 2 μm to 3 μm, and a refractive index nl1 of 1.5 to 1.7.

In the micro optical body 100B, the refractive index na2 of the second adhesive layer 4 and the refractive index nl1 of the lens structure 3 are set so that a return loss between connections is 25 dB or more. Alternatively, a refractive index n2_fi of a clad layer of the optical fiber 5 and the refractive index na2 of the second adhesive layer 4 are set so that a return loss between connections is 25 dB or more.

In the micro optical body 100B of Embodiment 2, a coupling tolerance in an xy (horizontally vertical) direction is smaller than that of the micro optical body 100A of Embodiment 1. Further, since light is incident on the optical fiber 5 in a state of being close to a plane wave, the same effect as that of the micro optical body 100A of Embodiment 1 can be obtained in terms of coupling efficiency.

EXPANSION OF EMBODIMENT

Although embodiments of the present invention has been described with reference to the embodiments, the present invention is not limited to the above embodiments. Various changes that can be understood by those skilled in the art can be made to the configuration and details of the present invention within the scope of the technical idea of the present invention.

REFERENCE SIGNS LIST

1 Si waveguide (SSC)
2 first adhesive layer
3 first lens structure
4 second adhesive layer
5 optical fiber
6 second lens structure
7 third adhesive layer
100 (100A, 100B) optical connection structure (micro optical body).

The invention claimed is:

1. An optical connection structure comprising:
a plurality of adhesive layers that are arranged in a propagation direction of light from a first optical waveguide to a second optical waveguide, wherein the optical connection structure couples the first optical waveguide to the second optical waveguide, wherein a mode field of the first optical waveguide is different than a mode field of the second optical waveguide, wherein the plurality of adhesive layers comprise a first adhesive layer and a second adhesive layer; and
a first lens structure on an interface between a first surface of the first adhesive layer and a second surface of the second adhesive layer, wherein the first adhesive layer, the first lens structure, and the second adhesive layer have a same refractive index.

2. The optical connection structure according to claim 1, wherein:
a refractive index of each of the plurality of adhesive layers and a refractive index of each clad layer of the first optical waveguide and the second optical waveguide that are in contact with the plurality of adhesive layers are set so that a return loss between connections has an absolute value of 25 dB or more.

3. The optical connection structure according to claim 1, wherein:
a refractive index of each of the plurality of adhesive layers and a refractive index of the first lens structure in contact with the plurality of adhesive layers are set so that a return loss between connections has an absolute value of 25 dB or more.

4. The optical connection structure according to claim 1, wherein:
a distance between an end face of the first lens structure and an end face of the first optical waveguide facing to the first lens structure is set to a value that is different from a neighborhood value of an integral multiple of an effective half-wavelength of light propagating in a portion of the plurality of adhesive layers located between the end face of the first lens structure and the end face of the first optical waveguide.

5. The optical connection structure according to claim 1, wherein:
a distance between an end face of the first lens structure and an end face of the second optical waveguide facing to the first lens structure is set to a value that is different from a neighborhood value of an integral multiple of an effective half-wavelength of light propagating in a portion of the plurality of adhesive layers located between the end face of the first lens structure and the end face of the second optical waveguide.

6. The optical connection structure according to claim 1, wherein:
the plurality of adhesive layers further comprises a third adhesive layer, the third adhesive layer different from the second adhesive layer;
the first adhesive layer is in contact with the first optical waveguide;
the third adhesive layer is in contact with the second optical waveguide;
the second adhesive layer is in contact with the first adhesive layer and the third adhesive layer; and
the optical connection structure further comprises a second lens structure on an interface between a third surface of the second adhesive layer and a fourth surface of the third adhesive layer.

7. The optical connection structure according to claim 6, wherein:
the first lens structure and the second lens structure include spherical surfaces; and
a radius of curvature of the first lens structure is smaller than a radius of curvature of the second lens structure.

8. The optical connection structure according to claim 6, wherein:
a refractive index of the first adhesive layer, a refractive index of the first lens structure, a refractive index of the second adhesive layer, a refractive index of the second lens structure, and a refractive index of the third adhesive layer satisfy:

$$nl1 \geq na1,\ nl1 \geq na2,\ nl2 \geq na2,\ \text{and}\ nl2 \geq na3,$$

wherein the refractive index of the first adhesive layer is na1, the refractive index of the first lens structure is nli, the refractive index of the second adhesive layer is na2, the refractive index of the second lens structure is nl2, and the refractive index of the third adhesive layer is na3.

9. A method of providing an optical connection structure, the method comprising:
arranging a plurality of adhesive layers in a propagation direction of light from a first optical waveguide to a second optical waveguide, wherein the optical connection structure couples the first optical waveguide to the second optical waveguide, wherein a mode field of the first optical waveguide is different than a mode field of the second optical waveguide, wherein the plurality of adhesive layers comprise a first adhesive layer and a second adhesive layer; and
disposing a first lens structure on an interface between a first surface of the first adhesive layer and a second surface of the second adhesive layer, wherein the first adhesive layer, the first lens structure, and the second adhesive layer have a same refractive index.

10. The method according to claim 9, wherein:
a refractive index of each of the plurality of adhesive layers and a refractive index of each clad layer of the first optical waveguide and the second optical waveguide that are in contact with the plurality of adhesive layers are set so that a return loss between connections has an absolute value of 25 dB or more.

11. The method according to claim 9, wherein:
a refractive index of each of the plurality of adhesive layers and a refractive index of the first lens structure in contact with the plurality of adhesive layers are set so that a return loss between connections has an absolute value of 25 dB or more.

12. The method according to claim 9, wherein:
a distance between an end face of the first lens structure and an end face of the first optical waveguide facing to the first lens structure is set to a value that is different from a neighborhood value of an integral multiple of an effective half-wavelength of light propagating in a portion of the plurality of adhesive layers located between the end face of the first lens structure and the end face of the first optical waveguide.

13. The method according to claim 9, wherein:
a distance between an end face of the first lens structure and an end face of the second optical waveguide facing to the first lens structure is set to a value that is different from a neighborhood value of an integral multiple of an effective half-wavelength of light propagating in a portion of the plurality of adhesive layers located between the end face of the first lens structure and the end face of the second optical waveguide.

14. The method according to claim 9, wherein:
the plurality of adhesive layers further comprises a third adhesive layer, the third adhesive layer different from the second adhesive layer;
the first adhesive layer is in contact with the first optical waveguide;
the third adhesive layer is in contact with the second optical waveguide;
the second adhesive layer is in contact with the first adhesive layer and the third adhesive layer; and
the method further comprises disposing a second lens structure on an interface between a third surface of the second adhesive layer and a fourth surface of the third adhesive layer.

* * * * *